United States Patent

[11] 3,595,378

| [72] | Inventor | Kiyomi Kamisaka |
| | | Tokyo, Japan |
| [21] | Appl. No. | 809,850 |
| [22] | Filed | Mar. 24, 1969 |
| [45] | Patented | July 27, 1971 |
| [73] | Assignees | Unitika Ltd. |
| | | Hyogo, Japan; |
| | | Mach Industries Co., Ltd. |
| | | Tokyo, Japan |
| [32] | Priority | Mar. 24, 1968 |
| [33] | | Japan |
| [31] | | Sho 43-18977 |

[54] TUBULAR BELT CONVEYOR
5 Claims, 4 Drawing Figs.

[52] U.S. Cl. .................................................. 198/184,
198/DIG. 2, 198/199, 198/201
[51] Int. Cl. ........................................................ B65g 37/00
[50] Field of Search ............................................ 198/184,
191, DIG. 2, 192

[56] References Cited
UNITED STATES PATENTS

| 1,427,553 | 8/1922 | Schwinger .................. | 198/184 |
| 2,212,024 | 8/1940 | Johns ......................... | 198/185 |
| 3,164,238 | 1/1965 | McCullagh .................. | 198/184 X |
| 3,326,354 | 6/1967 | Aydelott .................... | 198/184 |
| 3,429,422 | 2/1969 | Yoshimura .................. | 198/184 |

FOREIGN PATENTS

| 796,295 | 1/1936 | France ........................ | 198/DIG. 2 |
| 268,133 | 3/1927 | Great Britain .............. | 198/DIG. 2 |

*Primary Examiner*—Gerald M. Forlenza
*Assistant Examiner*—Frank E. Werner
*Attorney*—Wenderoth, Lind & Ponack

ABSTRACT: A pipe-shaped tubular belt conveyor. The conveyor is a rubber pipe having a seam extending along the entire length thereof. The outer surface of the pipe on the side opposite the seam side has a band mounted thereon which has a large number of cogs therein engaging with driving or supporting sprockets. The rubber pipe is an endless pipe and runs around supporting rolls at both ends. It is flattened as it runs around the supporting rolls.

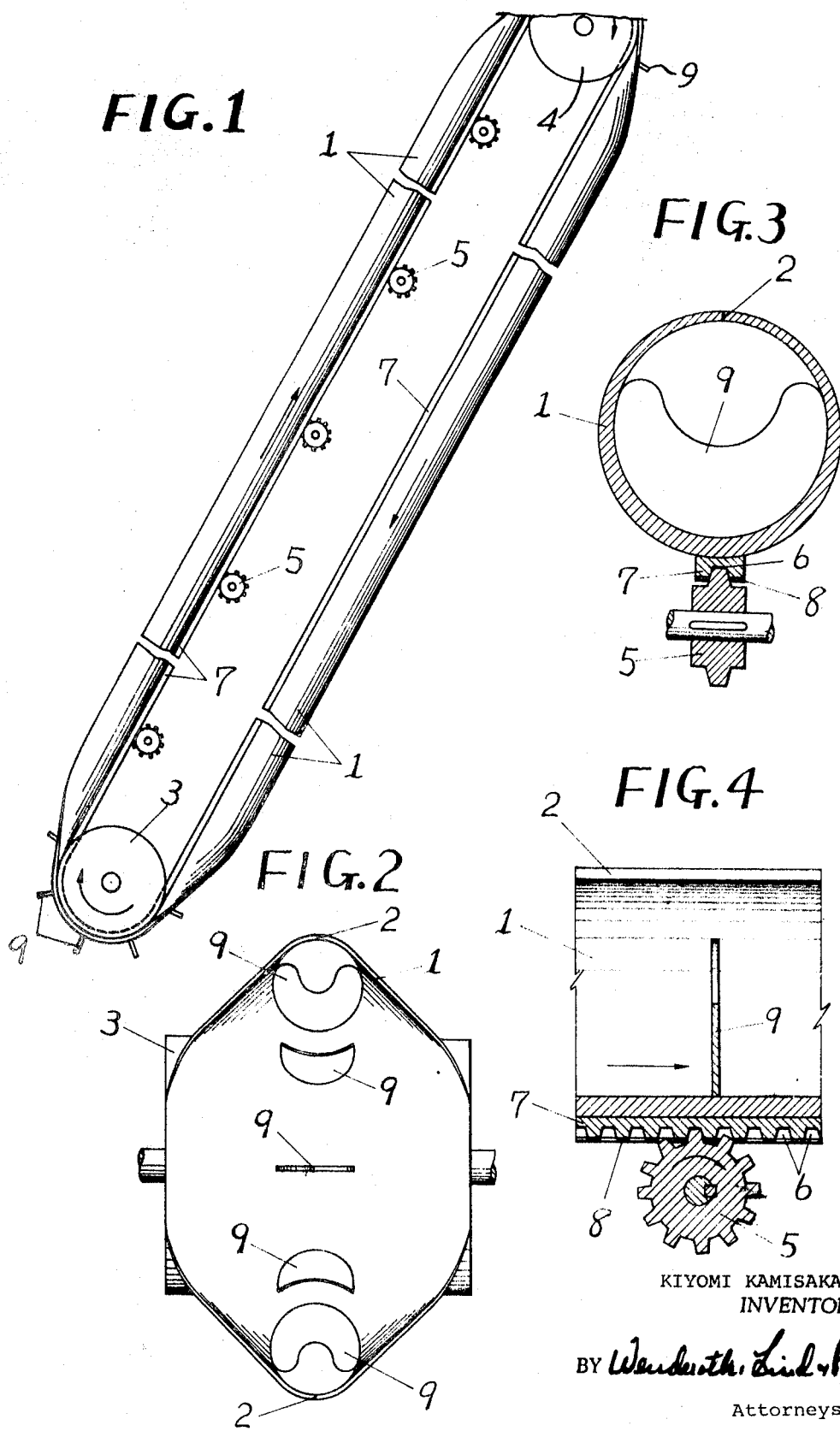

TUBULAR BELT CONVEYOR

BACKGROUND OF THE INVENTION

The conventional tubular belt conveyor uses a flat belt which requires a plurality of conveying rolls and other complicated devices for deforming the belt to open and close it between flat areas at both ends of the conveyor and the pipe-formed portions therebetween. This causes a number of practical difficulties in operating such equipment. By contrast, the present invention proposes a novel tubular belt conveyor which is completely devoid of the previous concept of using a flat belt and deforming it into a pipe, thus eliminating the aforementioned equipment for deforming the belt and for maintaining the middle portion of the belt in the form of a pipe.

BRIEF EXPLANATION OF DRAWINGS

FIG. 1 is a side view of the essential parts of an embodiment of the conveyor proposed by this invention; FIG. 2 is an enlarged front view of the essential parts of the return end of said conveyor;

FIGS. 3 and 4 are the front and side enlarged sections cut transversely and longitudinally, respectively.

DETAILED DESCRIPTION OF THE INVENTION

Rubber pipe 1 100 meters or more in length according to the need, with a seam 2 provided over the entire length thereof, is suspended flatly on the return rolls 3 and 4. Furthermore, the outer surface of said pipe 1 opposite to the seam 2 is fixedly provided with a rubber band 7 lined with a large number of cogs 6 which engage with sprockets 5 and also provided with a surface-reinforcing plate 8 in which numerous holes are made, the inside of the pipe 1 being secured to the roots of regressive conveyance preventing plates 9 of proper shape at definite intervals.

FIG. 1 illustrates an application of this conveyor at a sharp slope, but this invention may be embodied at any desired inclination, gentle, horizontal or vertical. Being made of rubber, this conveyor can be bent to some extent in intermediate sections in case the conveyor is used to cover a long route, and a suitable number of sprockets 5 can be operated by a driving force.

According to the above-described invention, any commercial rubber pipe 1 can be provided with the seam 2 over the entire length thereof. The ends of the pipe may be combined to form an endless tube which then is suspended flatly over the return support rolls 3 and 4. Such arrangement can be operated without the use of troublesome equipment and devices that are needed for deformation of conventional tubular conveyors, with the result that automatic opening and closing of the pipe is achieved by this invention in a manner different from any previous pipe conveyor. The economical merit of this invention is very great, for the new conveyor insures the safe conveyance of any powdered or other type of materials which are apt to be blown away or otherwise lost during their transport, with the resultant savings of material.

What I claim is:

1. A tubular belt conveyor comprising an endless flexible pipe, said pipe being tubular in its nondeformed condition for the retention of material therein and having a seam through its outer surface along the entire length thereof; a pair of supporting rolls, said pipe being suspended at opposite ends thereof over said rolls such that said seam is opened and said pipe is flattened in the areas of contact with said rolls; an endless band attached to said pipe on the surface thereof opposite said seam; and means operably associated with said band for driving said pipe.

2. a tubular belt conveyor as claimed in claim 1, wherein said endless flexible pipe is rubber.

3. A tubular belt conveyor as claimed in claim 1 wherein said band has a plurality of cogs therein, and said means for driving said pipe comprises at least one power driven sprocket mounted for engagement with said cogs.

4. A tubular belt conveyor as claimed in claim 3 further comprising a reinforcing plate mounted on said band and having a plurality of holes therethrough aligned with said cogs.

5. A tubular belt conveyor as claimed in claim 1 further comprising a plurality of plates mounted within the interior of said pipe.